United States Patent Office 2,805,087
Patented Sept. 3, 1957

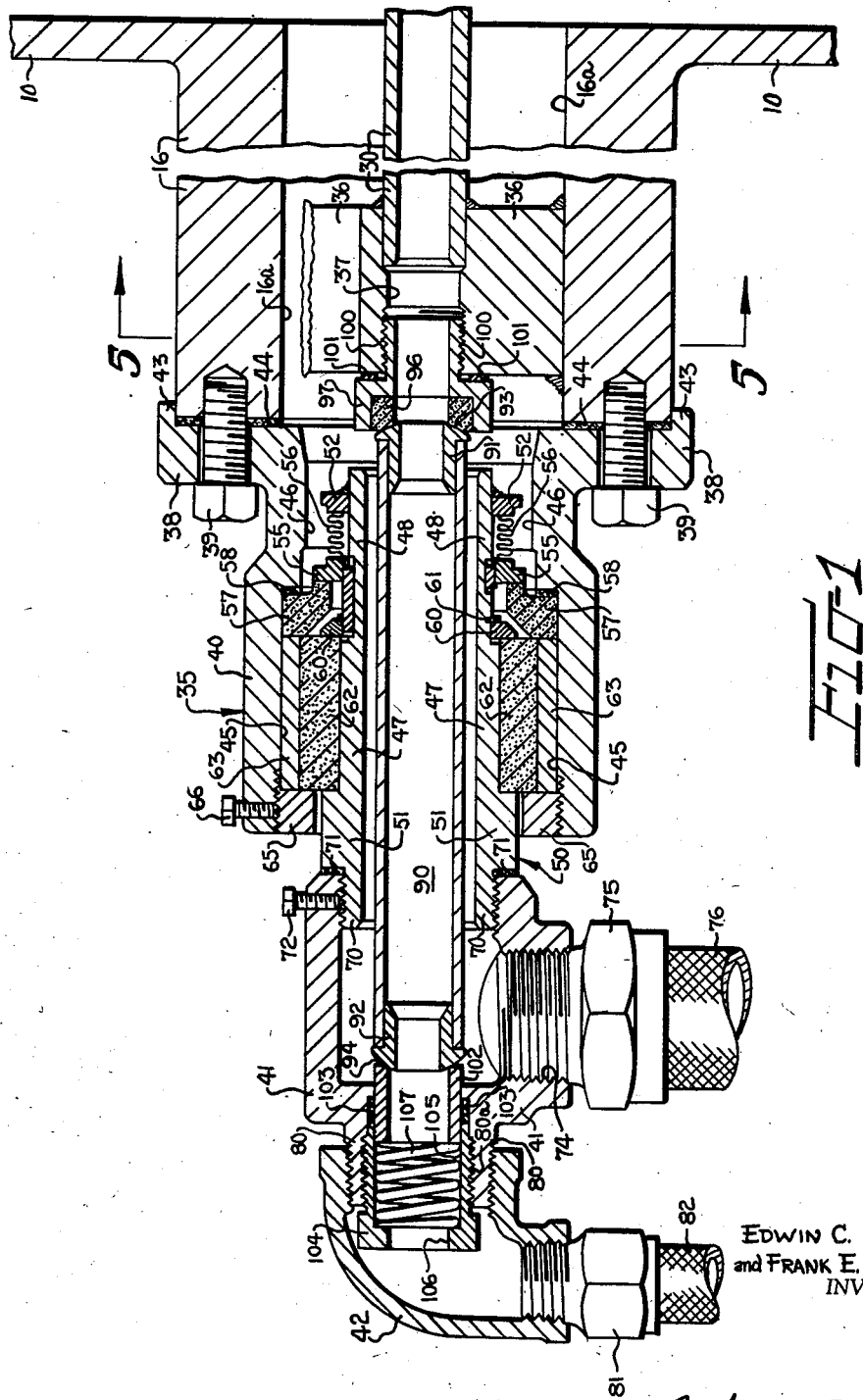

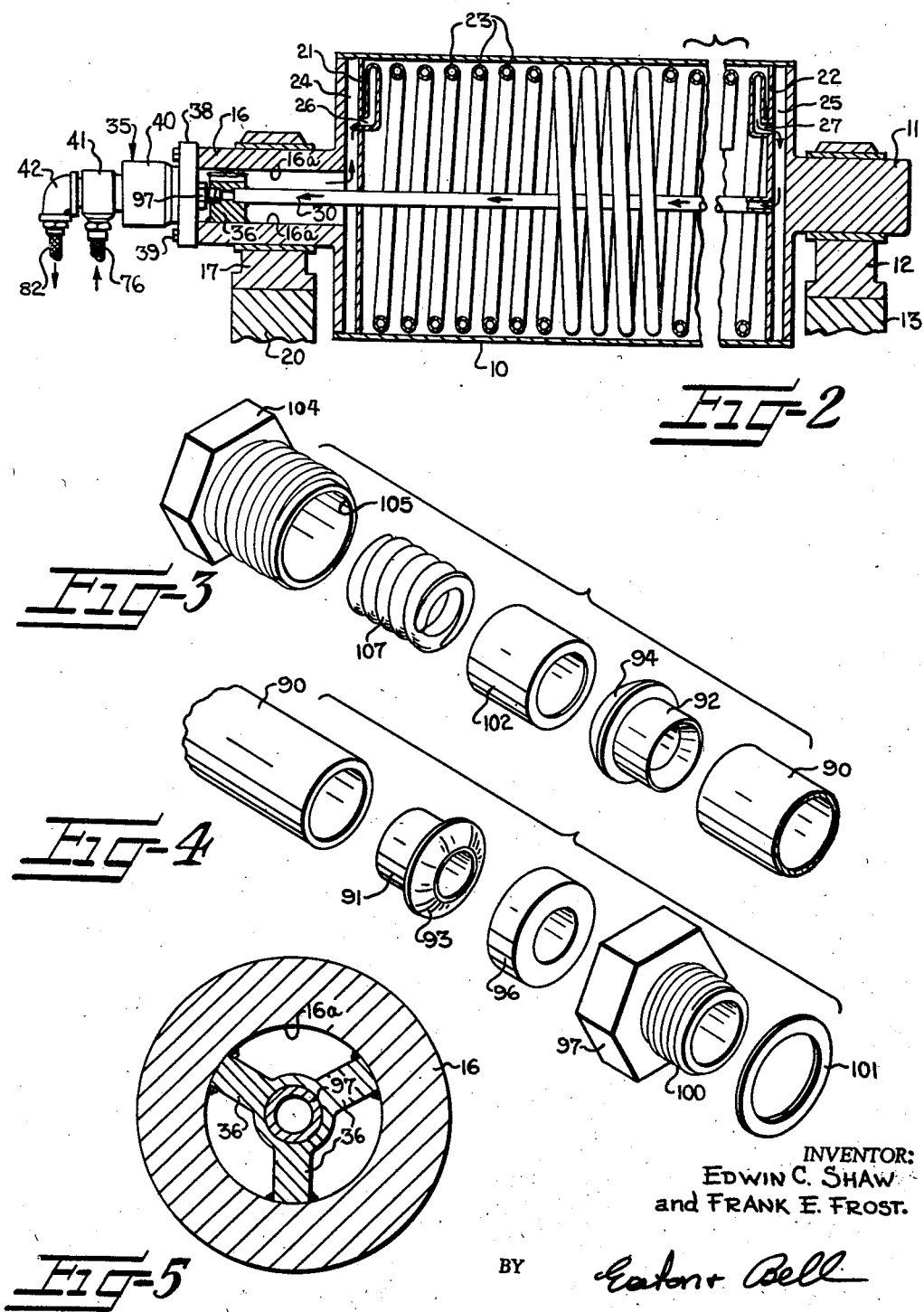

2,805,087

ROTARY JOINT WITH PLURAL NON-COMMUNICATING PATHS AND A FLOATING TUBULAR CORE

Edwin C. Shaw and Frank E. Frost, Charlotte, N. C., assignors to Perfecting Service Co., Charlotte, N. C., a corporation of North Carolina Application January 7, 1954, Serial No. 402,734

3 Claims. (Cl. 285—134)

This invention generally relates to rotary joints or rotary connections of the character employed for directing or channeling gases, liquids or other substances under pressure between stationary conduits or pipes and a rotating member, such as for channeling steam into a rotating drum and siphoning condensate out of the rotating drum.

Hereinafter, the improved rotary joint or connection will be described as a means for directing steam into a rotatable drum and withdrawing condensate from the rotatable drum. However, it is to be distinctly understood that the improved rotary joint or rotary connection may be used for many other purposes and for conducting other substances.

This invention relates particularly to the type of rotary connection wherein both inlet and outlet conduits are provided and wherein one of the conduits rotates with the rotary member to which the rotary connection is connected. For example, in many instances a rotatable heated drum has a condensate return pipe which is fixed thereto and which rotates therewith. In providing a rotary connection to a drum of this type many problems are encountered, primarily the problem of making the outlet conduit in the detachable rotary connection concentric with the fixed outlet conduit in the rotatable drum. Unless these parts are concentric the rotary connection will be subjected to strain causing excess wear, breakage and leaking.

It is therefore the primary object of this invention to provide a rotary connection having inlet and outlet conduits and wherein one of the conduits is a floating conduit supported at one end in the rotary connection and universally supported at its other end in the rotatable member.

More specifically, it is an object of this invention to provide an improved rotary connection of the character described comprising a composite casing or housing, to a medial portion of which an inlet pipe is connected and which has a longitudinally extending passageway therein for channeling steam or the like from the inlet pipe into a rotatable member, such as a drum. The outer end of the housing has a pipe fitting threadably or otherwise secured thereto to which an outlet or exhaust pipe is connected and this fitting communicates with a resiliently mounted bushing which is urged inwardly under resilient pressure. The inlet port of the rotating member or drum has a projection therein past which the inlet substance may pass in its course into the rotatable member or drum and this projection has one end of a siphon pipe connected thereto whose other end is disposed within the rotatable member or drum. The said projection also has a fixed bushing mounted therein and communicating with the corresponding end of the siphon pipe.

Now, in order to overcome the difficulties heretofore mentioned, a floating conduit, floating siphon tube or tubular core is loosely disposed within the passageway in the housing and opposite ends thereof are provided with self-centering arcuate or beveled surfaces which seat against the proximal ends of said bushings. The resiliently mounted bushing presses against the corresponding end of the floating tubular core and also serves to press the opposite end of the floating tubular core against the fixed bushing in the rotating members to thereby effect a tight seal between the bushings and opposite ends of the tubular core without the necessity of the tubular core being in perfect axial alinement with the spring-pressed bushing and the stationary bushing.

Since the floating tube is separate from the siphon tube per se, this eliminates one of the most prevalent difficulties heretofore experienced in rotary joints of this character in that it prevents breakage of the siphon tube.

It is another object of this invention to provide a rotary joint or rotary connection of the character last described wherein opposite ends of the floating tube are each provided with a hardened, ground and shouldered metal insert whose outer surface is rounded to form a tight seal between it and the corresponding bushing and also wherein at least one of said bushings, preferably the fixed bushing, has a wearable sealing insert therein such as graphite which is engaged by the end of the corresponding insert in the floating tube thereby further insuring a tight, leakproof seal between the fixed bushing and the insert in the corresponding end of the floating siphon tube.

Some of the objects of the invention having been stated, other objects will appear as the description proceeds, when taken in connection with the accompanying drawings, in which—

Figure 1 is a longitudinal vertical sectional view through the improved rotary joint showing a preferred arrangement of the improved floating siphon tube or tubular core therein;

Figure 2 is a longitudinal vertical sectional view through an illustrative device with which the improved rotary joint or connection may be associated and showing the improved rotary joint or connection in elevation;

Figure 3 is an enlarged exploded fragmentary isometric view of the seal connections between the left-hand portion of the floating siphon tube and the casing or housing of the improved rotary joint shown in the left-hand portion of Figure 1.

Figure 4 is an enlarged exploded isometric view showing the seal connections between the right-hand portion of the improved floating siphon tube in Figure 1 and the housing or casing of the improved rotary joint;

Figure 5 is a fragmentary vertical sectional view, on a reduced scale, taken substantially along line 5—5 in Figure 1.

Referring more specifically to the drawings, the numeral 10 indicates a rotatable drum which is one embodiment of any of many different types of rotatable devices with which the improved rotary connection or joint may be used. The rotatable drum is, therefore, more or less of a schematic character. The drum 10 has a journal portion 11 at one end thereof mounted in a suitable bearing stand 12 supported on a base 13. The other end of the drum 10 has a hollow or tubular journal 16 thereon having a passageway or bore 16a therethrough and which is mounted in a suitable bearing stand 17 supported by a base 20. Any suitable means, not shown, may be provided for rotating the drum 10.

The hollow journal 16 is provided to permit passage of air, steam, fluid or other substances into and/or out of the drum 10 while the drum 10 is rotating. For purposes of brevity, it is to be assumed that the substance which passes through the improved rotary connection or rotary joint are steam and condensate, respectively, and, in this instance, the drum is provided with a pair of partitions or baffles 21 and 22 spaced inwardly from opposite ends thereof and between which a steam coil 23 is disposed. The baffles or partitions 21, 22 define respective chambers 24, 25 adjacent opposite ends of the drum 10.

In operation, steam or another substance enters the chamber 24 through the bore 16a in the hollow journal 16 and then enters the coil 23 through an opening or aperture 26. The steam or other substance then passes through the coil 23 and emerges at its other end through an opening 27 which communicates with chamber 25. The steam or condensate resulting from the steam is then exhausted through an inner outlet pipe or siphon pipe 30 which communicates with chamber 25 at one end thereof, penetrates the baffle or partition 21 and extends axially into the bore 16a in the hollow journal 16.

Heretofore, outlet pipes of the character indicated at 30 in Figure 2 have been rigidly coupled to a pipe section which was, in turn, fixed in the rotary joint. Accordingly, in order to prevent strain, bending or, more likely, breakage of the outlet pipe, it has been necessary that the pipe section in the rotary joint housing be perfectly concentric with the housing and with the axis of the drum and the pipe in the drum in order to prevent leakage, strain and/or breakage of the outlet pipe or said pipe section.

It is apparent that this has required that the parts be manufactured within extremely close tolerances and that extreme care be used in mounting the rotary joints used heretofore on the hollow journals of such devices. In order to overcome these difficulties, and to eliminate precision machining and fabrication heretofore required to obtain perfect concentricity, means are provided for concentrically securing the outlet tube 30 within the bore 16a of the hollow journal 16 in combination with an improved rotary joint assembly or rotary connection assembly broadly designated at 35 and having a self centering floating pipe section.

Means for securing the outlet pipe 30 concentrically within the bore 16a of the hollow journal 16 is illustrated as a spider 36 having a concentric bore or passageway 37 therethrough and whose arms may be integral with the hollow journal 16, or which is secured therein as by a pressed fit, or as by being threaded thereinto, or as by welding. It is preferable that the spider 36 is made separately from the hollow journal 16, since there are many such hollow journals currently in use and the spider 36 may then be installed in the bore 16a of such hollow journals currently in use.

The outer end of the outlet pipe 30 is suitably secured to the inner portion of the spider 36 and communicates with the bore 37. In this instance, the outer end of the outlet pipe 30 is inserted in the inner end of the bore 37 and is fixed to the spider 36, by any suitable means such as welding.

Although the hollow journal 16 is shown, and has heretofore been described as a usual part of the rotatable device embodied in the drum 10, it is to be understood that the hollow journal 16 may also be manufactured with the spider 36 therein as one of the components of the improved rotary joint assembly 35. In this instance, the hollow journal 16 could be applied to the drum or rotatable member 10 at the time of its manufacture or in the field at the time of installation of the improved rotary joint assembly 35.

The housing of the improved rotary joint assembly 35 is, in fact, a composite housing formed from three different housings including a primary housing 40, a secondary housing or inlet housing 41 and an outer exhaust pipe coupling, elbow or outlet housing 42. The primary housing 40 is of tubular construction and has a circular flange portion 38 on its inner end which is penetrated by a plurality of screws 39 to secure the same to the outer end of the hollow journal 16. The outer end of the hollow journal 16 is preferably machined for slidably receiving an annular projection 43 on the inner end of the flange 38 to assist in concentrically supporting the primary housing 40 on the outer end of the hollow journal 16. A suitable annular gasket 44 is preferably disposed between the proximal surfaces of the flange 41 of the primary housing 40 and the outer end of the hollow journal 16.

It will be observed in Figure 1 that the outer portion of the primary housing 40 has a relatively large bore or circular cavity 45 therein which communicates with a restricted or relatively smaller bore or circular cavity 46 at the inner end of the primary housing 40. The restricted bore 46 communicates with the bore 16a in the hollow journal 16.

Now, it is apparent that the primary housing 40 rotates with the hollow journal 16 and the rotatable device or drum 10 and, disposed within the primary housing 40 are stepped first and second elongated reduced portions 47, 48 of a tubular shank member broadly designated at 50 and which tubular shank member has an enlarged portion 51 adjacent its outer end. The shank 50 forms one of the fluid conduits of the rotary joint and is sealed for relative rotational movement in the housing by suitable bearing and sealing means.

The preferred bearing and sealing means comprise a bellows retaining collar 52 sealed on the inner end of the reduced portion 48 of the shank member 50, by any suitable means such as welding. Spaced from the collar 52 is a face collar or face ring 55 which is keyed for axial movement on the second reduced portion 48 of the tubular shank member 50 and a spring bellows 56 disposed between and sealed to the collars 52 and 55 for exerting resilient pressure against the proximal surfaces of the rings or collars 52, 55. A gasket 58 is disposed against the shoulder formed at the juncture of the bores 45, 46 in the primary housing 40, and the outer surface of the gasket 56 is engaged by an annular bearing member 57, preferably formed from a soft metal impregnated with a suitable lubricant such as graphite, and which loosely encircles the reduced portion 48 of the tubular shank member 59. The collar 55 is held in sealing engagement with the bearing member 57 by the bellows 56.

The collar or face ring 55 is urged against the inner end of the annular bearing member 57 by the bellows 56 and the outer periphery of the annular bearing member 57 slidably fits in the bore 45 in the primary housing 40. The bellows 56 serves to provide an effective seal between the face ring or collar 55 and the annular bearing member 57. It will be observed in Figure 1 that the annular bearing member 57 is cut away and a third ring or thrust collar 60 is disposed about the reduced portion 48 of the tubular shank member 50 and is held in place by any suitable means, such as a retaining ring or snap ring 61. The third ring or thrust collar 60 is also keyed for axial movement on the reduced portion 48 of the shank member 50.

The intermediate or first reduced portion 47 of the shank member 50 slidably penetrates an inner tubular bearing and sealing member having an inner portion 62 which is preferably formed from a relatively soft metal impregnated with a suitable lubricant such as graphite and an outer sleeve portion 63 which is preferably made from a somewhat harder metal such as steel. The outer periphery of the steel sleeve 63 closely fits in the relatively large bore 45 in the primary housing 40.

The tubular portion 62 is preferably formed under pressure and shrunk and bonded to the sleeve 63 so that the expansion and contraction of the inner sleeve or bearing member 62 and the outer sleeve 63 will be as nearly uniform as possible. It is necessary to shrink the inner sleeve 62 before bonding the same to the sleeve 63, since the inner sleeve 62 will usually expand to a greater extent than the outer sleeve 63. The tubular bearing member 62 serves as a bearing and sealing member and one end thereof frictionally engages the ring 60 and its other end engages the shoulder formed at the juncture of the intermediate or first reduced portion 47 and the enlarged portion 51 of the tubular shank member 50.

The outer end of the bore 45 is internally threaded for reception of a threaded retaining ring or collar 65 which bears against the left-hand end of the bearing member 62 and the sleeve 63 in Figure 1. The enlarged portion 51 of the shank member 50 loosely extends through the annular retaining ring or collar 65. The retaining ring 65 may be held in place by a set screw 66 which threadably penetrates the wall of the tubular primary housing 40.

The retaining ring 65 holds the tubular bearings 62 and 63 securely within the primary housing 40 and also holds the annular bearing member 57 and the gasket 56 within said primary housing so that, when the primary housing 40 rotates, the bearing member 62, sleeve 63, annular bearing 57 and gasket 56 rotate with the primary housing 40 and the hollow journal 16.

The outer or left-hand end of the tubular shank member 50 in Figure 1 has a reduced externally threaded portion 70 thereon which is threadably engaged by the corresponding internally threaded end of the secondary housing or inlet housing 41. The housing 41 is tightened against a gasket 71 disposed against the shoulder formed at the juncture of the enlarged portion 51 and the reduced threaded portion 70 of the tubular shank member 50. A set screw 72 is also preferably provided for locking the secondary housing or inlet housing 41 on the reduced threaded portion 70 of the tubular shank member 50.

One side of the secondary housing or inlet housing 41 has a threaded bore inlet opening 74 therein for reception of a threaded coupling member 75 attached to a suitable inlet conduit, such as a pipe 76 which may be flexible, if desired. Various substances may be introduced into the secondary housing or inlet housing 41 by means of the pipe 76 and from whence the substance will flow through the tubular shank member 50 and through the bore 16a in the hollow journal 16, during the course of which the substance flows past the legs or arms of the spider 36 and then flows into the drum 10 in the manner heretofore described.

The outer end of the secondary housing or inlet housing 41 has a tubular projection 80 thereon on which the outlet housing, exhaust pipe coupling or elbow 42 is threadably mounted. The other end of the elbow 42 has a threaded pipe coupling 81 connected thereto to which an outer exhaust or outlet pipe 82 is connected. The outlet pipe 82 may be flexible, if desired, and serves to direct the substance or substances withdrawn from the drum 10 through the outlet pipe 30, to points remote from the rotary joint assembly or connection 35.

Heretofore, inner outlet or siphon pipes similar to pipe 30 have extended longitudinally through the rotary connections or rotary joints and have been connected in fixed relation to a fitting such as the outer end of the secondary housing or inlet housing 41 which, as heretofore stated, has made it necessary that the prior siphon pipe be accurately alined with the axis of the components of the rotary joint assembly in order to prevent placing the siphon pipe under undue stresses which would ultimately cause damage to or break the outlet or siphon pipe. This has necessarily required that the connections between elements, such as 40, 50, 41 and 42 be accurately machined and it has also required that extreme care be exercised in mounting the flange 38 of the primary housing 40 on the outer end of the hollow journal 16 in accurate alinement therewith. This has also been true wherein a separate pipe section has been provided within the composite housing including elements 40, 50, 41 and 42.

The present invention includes the spider member 36 mounted in the bore 16a of the hollow journal 16 in combination with a novel floating tubular core, core tube, core pipe or conduit disposed within said composite housing, and the manner in which it is mounted.

The improved core pipe, tube or conduit is indicated at 90 and loosely extends through the tubular shank member 50 and has the reduced proximal portions of a pair of ball-type tubular inserts suitably secured therein. The tubular inserts are indicated at 91 and 92 and are preferably made from a relatively hard metal which resists corrosion and chemical attack such as Monel metal or stainless steel. The reduced portions of the tubular inserts 91, 92 are preferably pressed into opposite ends of the core tube or pipe 90 and are also preferably welded to the tube 90.

The enlarged outer ends of the tubular inserts 91 and 92 are provided with respective hemispherical or arcuate surfaces designated at 93 and 94. Although the inserts 91 and 92 are shown on opposite ends of the core tube 90, it should be understood that these tubular inserts are provided as an expedient to the manufacture of the improved rotary joint assembly or rotary connection, since it is apparent that the inserts 91, 92 may be formed as integral parts of the tube 90, if desired; that is, opposite ends of the core tube 90 may be provided with the arcuate or hemispherical surfaces 93, 94 thereon.

The arcuate surface 93 of the insert 91 seats against a corresponding arcuate concave surface on one side of a bearing washer 96 which is preferably made from a somewhat softer metal than the metal from which the tubular insert 91 is formed and is also preferably impregnated with a suitable lubricant such as graphite. The graphite washer 96 is fitted in one enlarged end of a fixed bushing or seal cup 97 having a reduced externally threaded portion 100 thereon which is threadably mounted in the bore 37 in alinement with the inner outlet or siphon pipe 30.

A suitable washer or gasket 101 may be provided between the enlarged portion of the threaded bushing 97 and the spider 36 to prevent leakage.

The arcuate or hemispherical surface 94 of the tubular insert 92 is engaged by an axially slidable spring-pressed bushing 102 which slidably penetrates the outer end wall of the secondary housing or inlet housing 41 and the medial portion of which is surrounded by a packing ring 103 preferably made from asbestos, graphite or the like. The outer portion of the axially movable bushing 102 is mounted for sliding movement in a gland screw 104 which is threadably mounted in an outlet opening 80a in the projection 80 on the secondary housing 41 and whose enlarged outer end is disposed within the elbow 42. The inner or right-hand end of the gland screw 104 bears against and compresses the resilient packing washer or ring 103 to thereby permit axial movement of the bushing 102 without permitting leakage.

The inner portion of the gland screw 104 has a relatively large bore 105 therein which communicates with a relatively small bore or restricted bore 106. The axially movable bushing 102 is slidably mounted in the bore 105 and this bore 105 also has a compression spring 107 therein, one end of which engages the bushing 102 and the other end of which engages the shoulder at the juncture of the bores 105, 106.

It is thus seen that the compression spring 107 urges the bushing 102 against the curved or arcuate surface 94 of the tubular insert 92 thereby forming a leak-proof, ball-type or universal swivel connection between bushing 102 and insert 92. The spring 107 also urges the arcuate surface 93 of the tubular insert 91 against the bearing washer 96 to also form a leak-proof, ball-type or swivel connection therebetween. It is thus seen that an effective seal is provided between opposite ends of the improved core tube or conduit 90 and the bushing 102 and the bearing washer 96. Because of the arcuate surfaces 93 and 94 on the respective tubular inserts 91 and 92, it is apparent that the tube 90 will tend to be self centering but may extend at an angle relative to the axis of either of the bushings 97 or 102 as well as at an angle relative to the axis of the inner outlet or siphon pipe 30 without breaking the seal between the core conduit or tube 90 and the elbow 42 and the inner outlet pipe 30.

Of course, it is apparent that the angle of the axis of the core tube 90 may vary considerably relative to the axis of the inner outlet pipe 30 extending into the drum 10 without placing the outlet pipe 30 under stress and thereby obviating the possibility of damaging the rotary joint, to overcome one of the most prevalent defects in rotary connections or joints currently in use. Since the external diameter of the core tube or conduit 90 is substantially less than the internal diameter of the tubular shank member 50, it is apparent that substances may readily pass from the pipe 76 through the secondary housing 41, through the tubular shank member 50 and through the bore 16a in the hollow journal 16 into the drum or other rotatable device 10, during which passage the drum, the hollow journal 16 and the primary housing 40 may rotate while the tubular shank member 50, the secondary housing 41 and the outlet housing or elbow 42 remain stationary.

On the other hand, the condensate, which, in this instance, collects in the chamber 25 defined between the partition 22 and the right-hand end wall of the drum 10 (Figure 2), may be carried off through the inner outlet or siphon pipe 30, through the bore 37 in the spider 36 and pass successively through bushing 97, bearing washer 96, insert 91, core pipe or conduit 90, insert 92, bushing 102, spring 107, and bore 105 and through the restricted bore 106 into the outlet housing or elbow 42, from whence the substance or condensate passes through the fitting 81 and is channeled to points remote from the improved rotary joint assembly or rotary connection 35 through the pipe 82.

Although it has heretofore been indicated that the substance or substances pass from left to right through the tubular shank member 50 and from right to left through the core tube 90, it is apparent that substances may pass in the same direction through both the tubular shank member 50 and the tubular core or the core tube 90, or the substances may pass through the tubular shank member 50 and the core tube 90 in the opposite directions from that heretofore described.

In the drawings and specification there has been set forth a preferred embodiment of the invention and, although specific terms are employed, they are used in a generic and descriptive sense only and not for purposes of limitation, the scope of the invention being defined in the claims.

We claim:

1. The combination with a rotatable member having a rotatable hollow journal and a conduit fixed in said journal and rotatable therewith of a rotary fluid connection comprising a primary housing fixed to and rotatable with the outer end of said hollow journal and communicating with the interior of said hollow journal, a normally stationary tubular shank member mounted in said primary housing, said primary housing being rotatable about said shank member, bearing and sealing means between the primary housing and the tubular shank member, a stationary housing fixed to said tubular shank member in substantially axial alinement therewith and having a first opening in one side thereof and a second opening in its end remote from said hollow journal, a core tube extending axially through said tubular shank member and independently rotatable relative to said shank member and said hollow journal, the outside diameter of said core tube being less than the inside diameter of the tubular shank to permit fluid to flow therebetween, a support member fixed in said hollow journal, for supporting said conduit, a first bushing carried by said support member and communicatively connected to said conduit, a second bushing rotatably mounted in the stationary housing in substantial axial alinement with the first bushing and communicating with the second opening in said stationary housing, said core tube having arcuate annular surfaces on each end thereof adapted to mate with and seal against said respective bushings, means urging at least one of said bushings against the arcuate surface on the corresponding core tube end to maintain a fluid seal upon rotative and gyrational movement of said core tube relative to said bushings, said core tube and said bushings providing a first fluid passageway to the conduit in said journal and said shank member providing a second and independent fluid passageway to the hollow journal.

2. The combination with a rotatable member having a rotatable hollow journal and a conduit fixed in said journal and rotatable therewith of a rotary fluid connection comprising a primary housing fixed to and rotatable with the outer end of said hollow journal and communicating with the interior of said hollow journal, a normally stationary tubular shank member mounted in said primary housing, said primary housing being rotatable about said shank member, bearing and sealing means between the primary housing and the tubular shank member, a stationary housing fixed to said tubular shank member in substantially axial alinement therewith and having a first opening in one side thereof and a second opening in its end remote from said hollow journal, a core tube extending axially through said tubular shank member and independently rotatable relative to said shank member and said hollow journal, the outside diameter of said core tube being less than the inside diameter of the tubular shank to permit fluid to flow therebetween, an open support member fixed in said hollow journal for supporting said conduit, a first bushing carried by said support member and communicatively connected to said conduit, a second bushing slidably and rotatably mounted in the stationary housing in substantial axial alinement with the first bushing and communicating with the second opening in said stationary housing, said core tube having arcuate annular surfaces on each end thereof adapted to mate with and seal against said respective bushings, spring means urging said second bushing against the core tube to maintain a running fluid seal between said bushings and the ends of the core tube upon rotative and gyrational movement of said core tube relative to said bushings, said core tube and said bushings providing a first fluid passageway to the conduit in said journal and said shank member providing a second and independent fluid passageway to the hollow journal.

3. In combination with a rotating member having a hollow journal and a pipe extending from the rotating member into the journal and rotatable therewith, an open support element mounted in the journal for supporting said pipe in spaced relation to the journal walls, said support element having a passageway therethrough communicating at its inner end with said pipe and a hollow bushing fixed in the outer end of said support element and communicating with said passageway, a primary housing fixed to said journal and rotatable therewith, bearing means carried by the primary housing, a stationary fluid passage shank member mounted in said bearing means and communicating with the hollow journal and about which the primary housing rotates, rotary fluid sealing means between said shank and said bearing for preventing fluid leakage, a stationary secondary housing secured to the outer end of said shank and having a fluid passageway therethrough communicating with said shank, said secondary housing having an inlet opening therein for the introduction of fluid thereinto, a tertiary hollow housing secured to the secondary housing, said secondary housing having an outlet bore communicating with the tertiary housing and a freely rotatable fluid passage core connecting the outlet bore in the secondary housing with the hollow bushing in the support element in the journal comprising a secondary tubular bushing slidably and rotatably mounted in the outlet bore in the secondary housing, spring means urging said bushing toward the primary housing and a rigid core member extending through said shank and having bearing elements on each end thereof frictionally and rotatably engaging said respective bushing, said rigid core member being rotatable relative to said shank member and to said hollow journal, said bushings each having a generally arcuate concave surface and each of the bearing elements on the core ends having a mating surface of generally arcuate convex contour whereby upon rotation of said journal said rigid core may have universal rotational movement relative to at least one of said bushings without fluid leakage therebetween.

References Cited in the file of this patent

UNITED STATES PATENTS

| | | |
|---|---|---|
| 1,872,665 | Brownell | Aug. 23, 1932 |
| 2,352,317 | Goff | June 27, 1944 |
| 2,462,734 | Ferris | Feb. 22, 1949 |